(12) United States Patent
Pelletier et al.

(10) Patent No.: US 9,395,231 B2
(45) Date of Patent: Jul. 19, 2016

(54) SYSTEM AND METHOD FOR CALIBRATING A WIND VANE OF A WIND TURBINE

(71) Applicant: GESTION VALEO S.E.C., Montréal (CA)

(72) Inventors: Francis Pelletier, Montreal (CA); Souheil-Antoine Tahan, Montreal (CA)

(73) Assignee: SOCOVAR, LIMITED PARTNERSHIP, Montreal (CA)

( * ) Notice: Subject to any disclaimer, the term of this patent is extended or adjusted under 35 U.S.C. 154(b) by 336 days.

(21) Appl. No.: 14/067,206

(22) Filed: Oct. 30, 2013

(65) Prior Publication Data

US 2014/0116106 A1    May 1, 2014

Related U.S. Application Data

(60) Provisional application No. 61/720,145, filed on Oct. 30, 2012.

(51) Int. Cl.
*G01F 25/00* (2006.01)
*G01P 13/02* (2006.01)
*G01P 21/02* (2006.01)
*F03D 11/00* (2006.01)

(52) U.S. Cl.
CPC ........ *G01F 25/0007* (2013.01); *F03D 11/0091* (2013.01); *G01P 13/02* (2013.01); *G01P 21/025* (2013.01); *F05B 2270/321* (2013.01); *F05B 2270/802* (2013.01); *Y02E 10/722* (2013.01)

(58) Field of Classification Search
CPC ............... F03D 11/0091; F03D 7/0204; F05B 2270/321; F05B 2270/802; G01P 13/02; Y02E 10/723; Y02E 10/722
USPC .................................................. 73/1.27–1.28
See application file for complete search history.

(56) References Cited

U.S. PATENT DOCUMENTS

| 4,084,921 A | 4/1978 | Norz |
| 4,142,830 A | 3/1979 | Schonball |
| 4,316,096 A * | 2/1982 | Syverson .............. F03D 7/0236 290/44 |
| 4,403,916 A | 9/1983 | Skelskey |
| 4,571,155 A | 2/1986 | Angeloff |

(Continued)

OTHER PUBLICATIONS http://www.wattcraft.com/technical/wind-energy-technical-summary/.

*Primary Examiner* — Hezron E Williams
*Assistant Examiner* — Nashmiya Fayyaz
(74) *Attorney, Agent, or Firm* — Norton Rose Fulbright Canada LLP (57) ABSTRACT

A system for calibrating a wind indicator device of a wind turbine of the horizontal-axis type in which a shaft has a portion in a nacelle, the wind indicator device being on an exterior of the nacelle. The system comprises a shaft interface adapted to be positioned on the shaft of the wind turbine in a known manner relative to an orientation of the shaft. An extended body is connected to the shaft interface, the extended body projecting from the shaft interface positioned on the shaft to an exterior of the nacelle. An alignment device is connected to the extended body, the alignment device having a visual indicator at the exterior of the nacelle representative of an orientation of the shaft of the nacelle when the shaft interface is positioned on the shaft in the known manner, whereby a calibration of the wind indicator device is achieved using the visual indicator device. A method for calibrating the wind indicator device is also provided.

20 Claims, 5 Drawing Sheets

(56) References Cited

U.S. PATENT DOCUMENTS

| | | |
|---|---|---|
| 4,767,939 A | 8/1988 | Calley |
| 5,140,856 A | 8/1992 | Larsen |
| 5,295,793 A | 3/1994 | Belden |
| 6,320,273 B1 | 11/2001 | Nemec |
| 7,014,416 B2 | 3/2006 | Lund |
| 2009/0087311 A1 | 4/2009 | Wyborn |
| 2012/0133138 A1 | 5/2012 | Sorensen |

* cited by examiner

SYSTEM AND METHOD FOR CALIBRATING A WIND VANE OF A WIND TURBINE

CROSS-REFERENCE TO RELATED APPLICATION(S)

The present application claims priority on U.S. Patent Application No. 61/720,145, filed on Oct. 30, 2012, and incorporated herein by reference.

TECHNICAL FIELD

The present disclosure relates to wind turbines of the horizontal-axis type and, more particularly, to a system and method for calibrating an orientation of a wind vane or wind indicator relative to an orientation of the wind turbine.

BACKGROUND OF THE ART

Wind turbines of the horizontal-axis type are commonly used for the generation of electric power. Such wind turbines have an impeller that is commonly held high above the ground and exposed to the wind. The impeller is typically connected to a shaft extending into a nacelle, with the shaft being connected to a mechanism that will transmit wind forces to a generator.

In order to maximize the generation of power, it is desired to align the impeller at a desired orientation relative to the wind, e.g., having a plane of the impeller perpendicular to the wind, or the rotational axis of the impeller parallel to the wind. For this purpose, a wind vane or wind indicator is provided on top of the nacelle of the wind turbine, to provide an indication of the direction of the wind. The indication of the wind direction may then be used to adjust an orientation of the impeller, by rotating the nacelle supporting the impeller about its vertical axis, i.e., about the tower supporting the nacelle.

One of the issues pertaining to wind turbines of the horizontal-axis type is the calibration of the wind indicator or wind vane relative to the orientation of the impeller. Indeed, it is desired to align the impeller with a direction of the wind to maximize the amount of force collected from the wind. However, if the calibration of the wine indicator/vane relative to the wind turbine is imprecise, the orientation of the impeller may also lack precision and hence not be optimal for maximizing the amount of force collected from the wind.

SUMMARY

It is an aim of the present disclosure to provide a system for calibrating a wind vane of a wind turbine that addresses issues associated to the prior art.

It is an aim of the present disclosure to provide a method for calibrating a wind vane of a wind turbine that addresses issues associated to the prior art.

Therefore, in accordance with an exemplary embodiment of the present disclosure, there is provided a system for calibrating a wind indicator device of a wind turbine of the horizontal-axis type in which a shaft has a portion in a nacelle, the wind indicator device being on an exterior of the nacelle, the system comprising: a shaft interface adapted to be positioned on the shaft of the wind turbine in a known manner relative to an orientation of the shaft; an extended body connected to the shaft interface, the extended body projecting from the shaft interface positioned on the shaft to an exterior of the nacelle; and an alignment device connected to the extended body, the alignment device having a visual indicator at the exterior of the nacelle representative of an orientation of the shaft of the nacelle when the shaft interface is positioned on the shaft in the known manner; whereby a calibration of the wind indicator device is achieved using the visual indicator device.

Further in accordance with an exemplary embodiment of the present disclosure, there is provided a method for calibrating a wind indicator device of a wind turbine of the horizontal-axis type in which a shaft has a portion in a nacelle, the wind indicator device being on an exterior of the nacelle, the method comprising: positioning a shaft interface on a portion of the shaft in the nacelle in axial alignment with a longitudinal axis of the shaft; extending the axial alignment to an exterior of the nacelle by connecting an extended body to the shaft interface, the extended body having a visual indicator at the exterior of the nacelle representative of the axial alignment; and calibrating the wind indicator device by comparing the axial alignment of the shaft to an orientation of the wind indicator device.

DESCRIPTION OF THE PREFERRED EMBODIMENT

Figure 1:
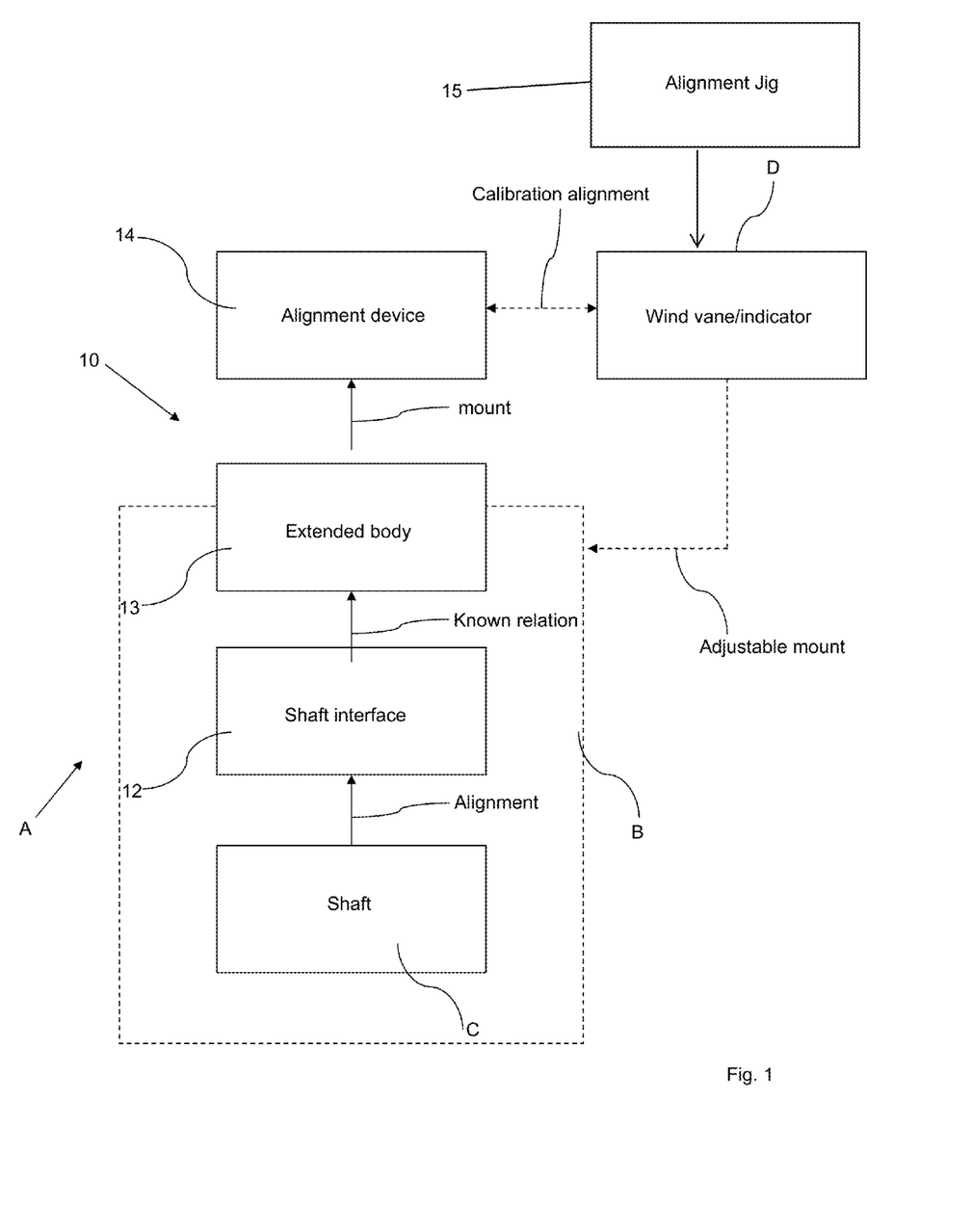
FIG. 1 is a block diagram of a system for calibrating a wind vane of a wind turbine in accordance with an exemplary embodiment of the present disclosure.

Referring to the drawings and more particularly to FIG. 1, there is illustrated at 10 a calibration system for a wind vane/indicator of a wind turbine. The wind turbine is of the horizontal-axis type in which numerous components of the wind turbine A are located in a nacelle B. For instance, shaft C (e.g., including the high speed shaft and the low speed shaft in some instances) extends in the nacelle B. A portion of the shaft C projects outside of the nacelle B and supports the impeller. The impeller is driven by the wind, and is usually in a perpendicular relation with a longitudinal axis of the shaft C. In other words, the longitudinal axis of the shaft C is normal to a plane of the impeller, as the longitudinal axis of the shaft C is the rotational axis of the impeller. A wind vane or wind indicator D is typically located on the outside of the nacelle B. The wind vane, wind indicator, or wind indicator device D is of the type indicating a direction of the wind, for instance by providing a digital signal to a controller unit of the wind turbine A. For simplicity, reference is made hereinafter to a wind vane D. The readings provided by the wind vane D are used to align the wind turbine A with a direction of the wind. This alignment typically has the shaft C as parallel as possible to the direction of the wind, or at a selected angle relative to a direction of the wind (e.g., 3 degrees). Either way, the calibration system 10 allows the calibration of the wind vane D relative to the impeller such that the impeller may be oriented to a desired axis relative to the wind.

The calibration system 10 has a shaft interface 12. The shaft interface 12 is configured to be mounted in an expected manner to the shaft C for alignment. The shaft interface 12 may be said to be in axial alignment with the shaft C, as it connects to the shaft in a known manner relative to the longitudinal axis of the shaft C. For instance, the shaft interface 12 has a frame with four different legs/contact surfaces. As a function of the cylindrical shape of the shaft C, the four different legs of the shaft interface 12 may be spaced apart by a predetermined distance such that the interconnection between the shaft interface 12 and the shaft C is predictable, as shown hereinafter. Other configurations are possible as well to perform a predictable connection between the shaft interface 12 and the shaft C.

The calibration system 10 further comprises an extended body 13 that connects to the shaft interface 12 in a predictable manner. According to an embodiment, the extended body 13 is connected to the shaft interface 12 on site, once the shaft interface 12 is against the shaft C or in close proximity thereof. The extended body 13 is typically a substantially rigid elongated member that is sized to extend from the shaft interface 12 to an exterior of the nacelle B, by an access door of the nacelle B. Accordingly, once the extended body 13 is installed on the shaft interface 12, with the shaft interface 12 mounted to the shaft C, an end of the extended body 13 extends outside of the nacelle. The end of the extended body 13 has a mount to support an alignment device 14 in a reproducible manner. In an embodiment, the alignment device 14 defines or produces a line that is substantially parallel to the shaft C. For instance, the alignment device 14 may be a laser unit that produces a visual line indicator. In another embodiment, the orientation of the alignment device 14 relative to the shaft C is known in a generally horizontal plane.

The alignment device 14 may therefore be used as a visual indication of the orientation of the shaft C. Accordingly, the wind vane D may be calibrated by referring to the alignment device 14 or its output. Once it is calibrated, the wind vane D produces a wind orientation reading that is precisely related to an orientation of the wind turbine A.

An alignment jig 15 is also shown in FIG. 1 as being mounted to the wind vane D. Considering that the wind vane D is free to rotate about a vertical axis and is exposed to winds on top of the nacelle B, the wind vane D may be prevented from rotating during the calibration step. The alignment jig 15 may also be used to provide an indication of the orientation of a pointer of the wind vane B.

Figure 3:
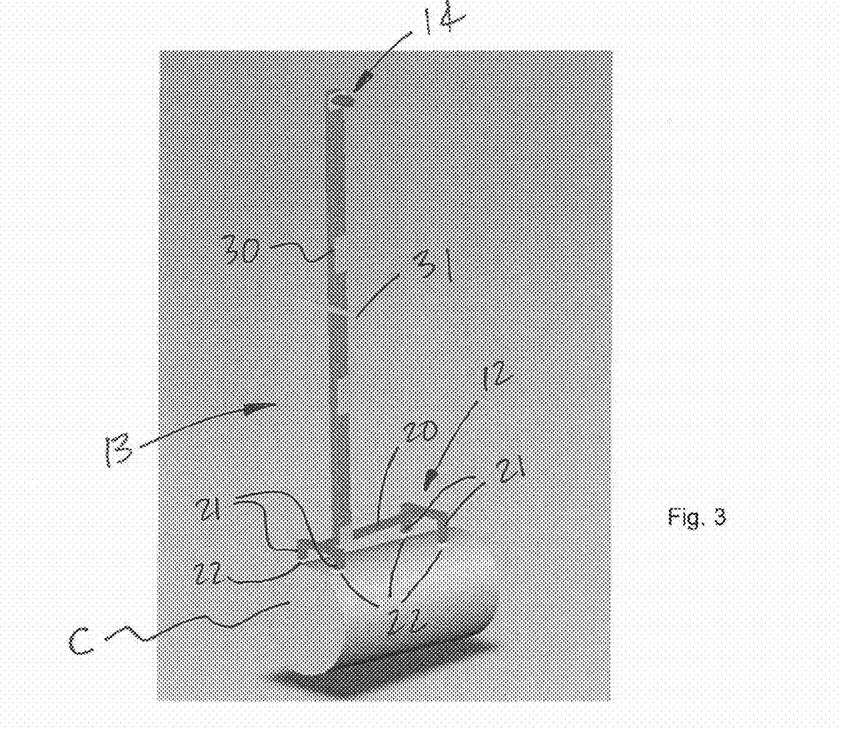
FIG. 3 is a schematic view of a shaft interface of the system of FIG. 1 as mounted to a shaft of the wind turbine.
Figure 4:
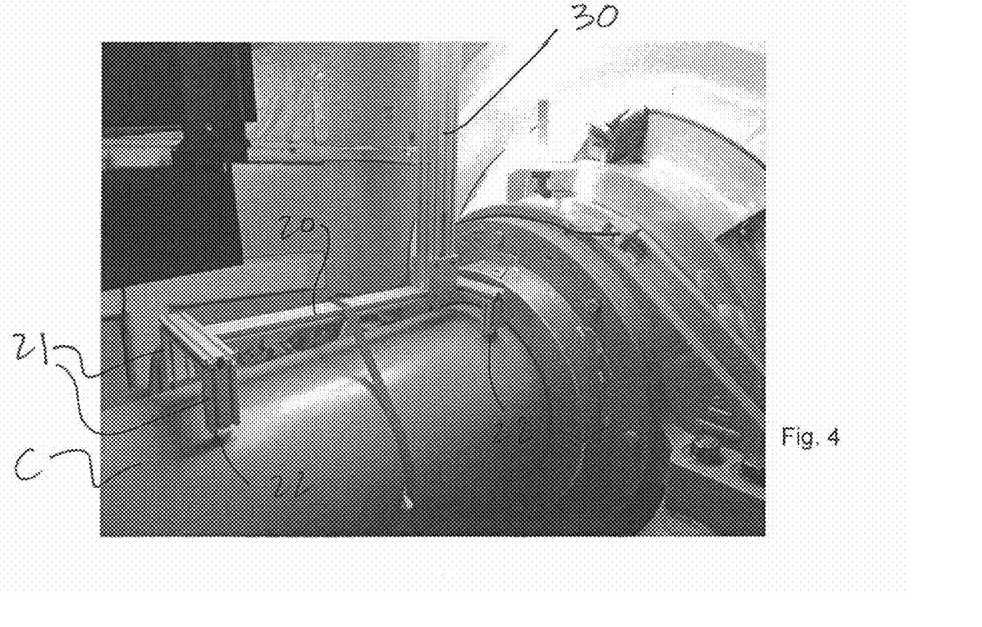
FIG. 4 is a picture of the shaft interface of FIG. 3 on the shaft.

Referring concurrently to FIGS. 3 and 4, an embodiment of the shaft interface 12 is shown in greater detail. The shaft interface 12 has a pair of inverted U-shaped frames interconnected by a beam 20 to define four different legs 21. Blocks 22 may be provided at free ends of the legs 21. In an embodiment, the blocks 22 are made of a rigid polymer or like material that will not scratch a surface of the shaft C. For instance, the blocks 22 may be made of PTFE or any other suitable material. The blocks 22 may have a curved contact surface, an elongated contact surface (e.g., aligned with a longitudinal direction of the shaft), etc. A connector may be provided on the beam 20 to connect the extended body 13 thereto. A first pair of the contact surfaces at the end of the legs 21 are diametrically offset at a first axial location (i.e., at different locations along the diameter at a same axial position), and with a second pair of the contact surfaces being diametrically offset at a second axial location. According to another embodiment, there are two contact elements instead of the four blocks 22. For example, a pair of elongated components could suffice, with a single inverted U-shaped frame, and no beam 20.

Figure 5:
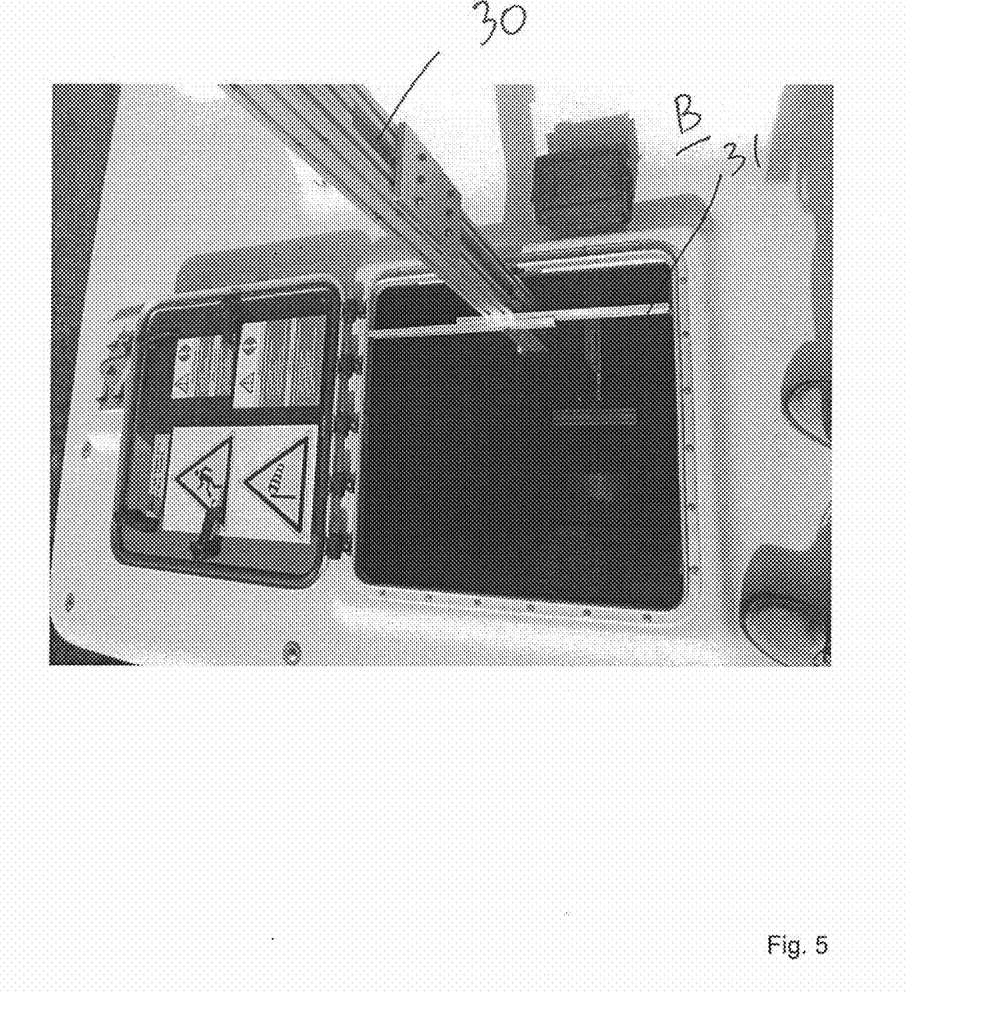
FIG. 5 is a perspective picture of an extended body with stabilizer member as connected to a nacelle.

The extended body 13 may consist of one or more elongated members 30 interconnected to one another. The elongated member(s) 30 may be metallic extrusions that offer a high structural integrity against torsion forces. For instance, Bosch extrusions in aluminum are one solution considered to define the extended body 13. A stabilizer member 31 may be releasably connected to the extended body 13. The stabilizer member 31 is generally transversely oriented relative to the extended body 13, and releasably connects to a wall of the nacelle B to reduce any vibration and/or movement of the alignment device 14 on the free end of the extended body 13. Referring to FIG. 5, the stabilizer member 31 connects to a nacelle door frame. In order to adapt the extended body 13 to various types of nacelles, the stabilizer member 31 may be positioned at different heights on the elongated members 30. For instance, there may be provided a translational joint between the stabilizer member 31 and the elongated member 30. In yet another embodiment, the joint has a rotational degree of freedom and a translational degree of freedom.

It is pointed out that the combination of the shaft interface 12 and the extended body 13 is used to provide an orientation of the longitudinal axis to the exterior of the nacelle B, e.g., with the extended body 13 lying a common plane with the longitudinal axis of the shaft C. Hence, there may be some freedom of movement of the calibration system 10 on the shaft C. For instance, the position of the alignment device 14 in the X-, Y- and Z-axes relative to the shaft C may be varied. Moreover, the orientation of the alignment device about two of its three rotational axes may also be varied. The calibration system 10 must however prevent rotation about a vertical axis. This entails that the various components have high structural stiffness against torsion.

As the access to the nacelle B may be limited to a confined space within the tower, it is considered to have the shaft interface 12 and the extended body 13 disassembled, yet readily assembled in a known and reproducible manner with suitable structural integrity, that will allow the alignment device 14 to provide a reliable and precise indication of the orientation of the shaft C. Moreover, the weight must be reduced as much as possible. It is considered to have the shaft interface 12 and the extended body 13 made of multiple interconnectable segments.

The alignment device 14 may be any appropriate visual indication device for producing an output replicating an orientation of the shaft. For example, an alignment laser with suitable precision could be used to replicate the center line of the shaft C on top of the nacelle B. Alternatives include any tangible or visual marker, etc, that replicate the orientation of the shaft C, such as an elongated bar that is in a known orientation (e.g., parallel, perpendicular) relative to the shaft C when the calibration system 10 is on the shaft C, etc.

Figure 6:
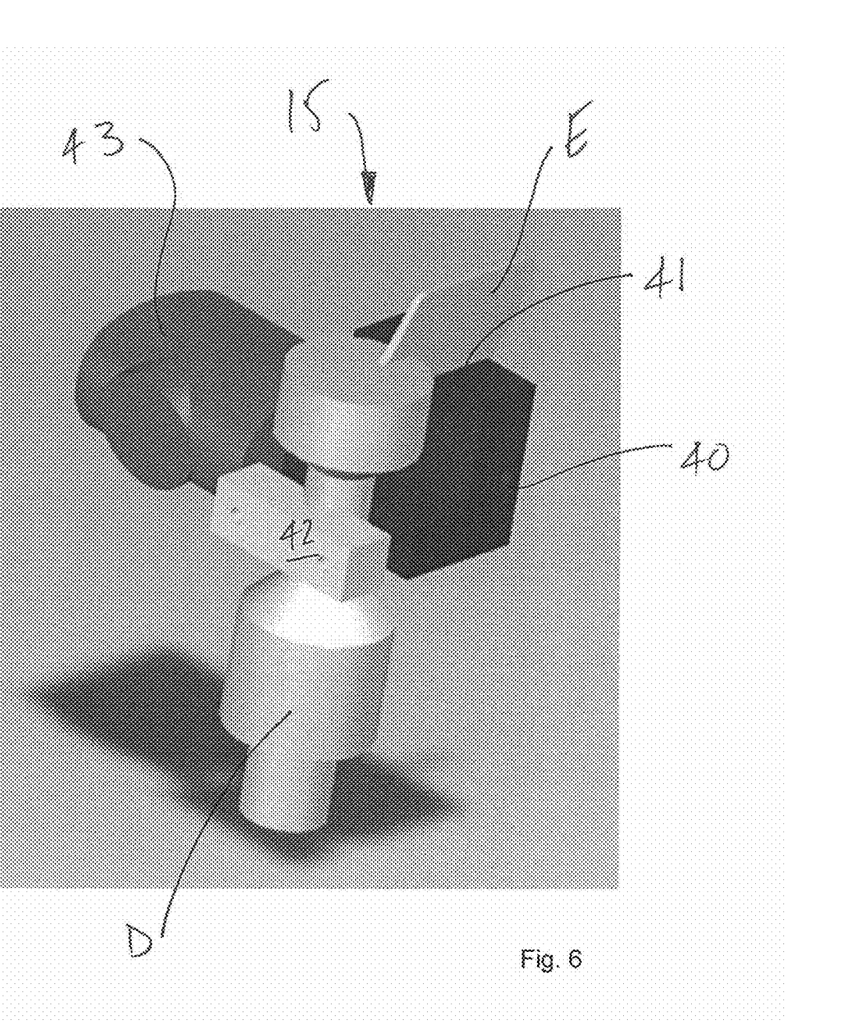
FIG. 6 is a schematic view of a wind vane with an alignment jig.

Referring to FIG. 6, the alignment jig 15 is shown having a block 40 that connects to a tail or pointer E of the wind vane D. The block 40 may for instance have a slot 41 that receives an edge of the pointer E. Any other appropriate configuration of the block 40 is considered, as a function of the type of wind vane/wind indicator device D that is used. A connection block 42 may also be used to temporarily attach the block 40 to the wind vane D, in the manner shown in FIG. 6. According to an embodiment, a visual indicator 43 such as a laser unit or like light-emitting device may be connected to the connection block 42 and produce a light beam that is parallel to the slot 41, and hence to the pointer E. Therefore, with such a light beam, an angle between the axis of the shaft and the pointer E may be determined for a temporarily fixed orientation of the wind vane D, allowing a user to reset the wind vane D taking into account this angle.

Figure 2:
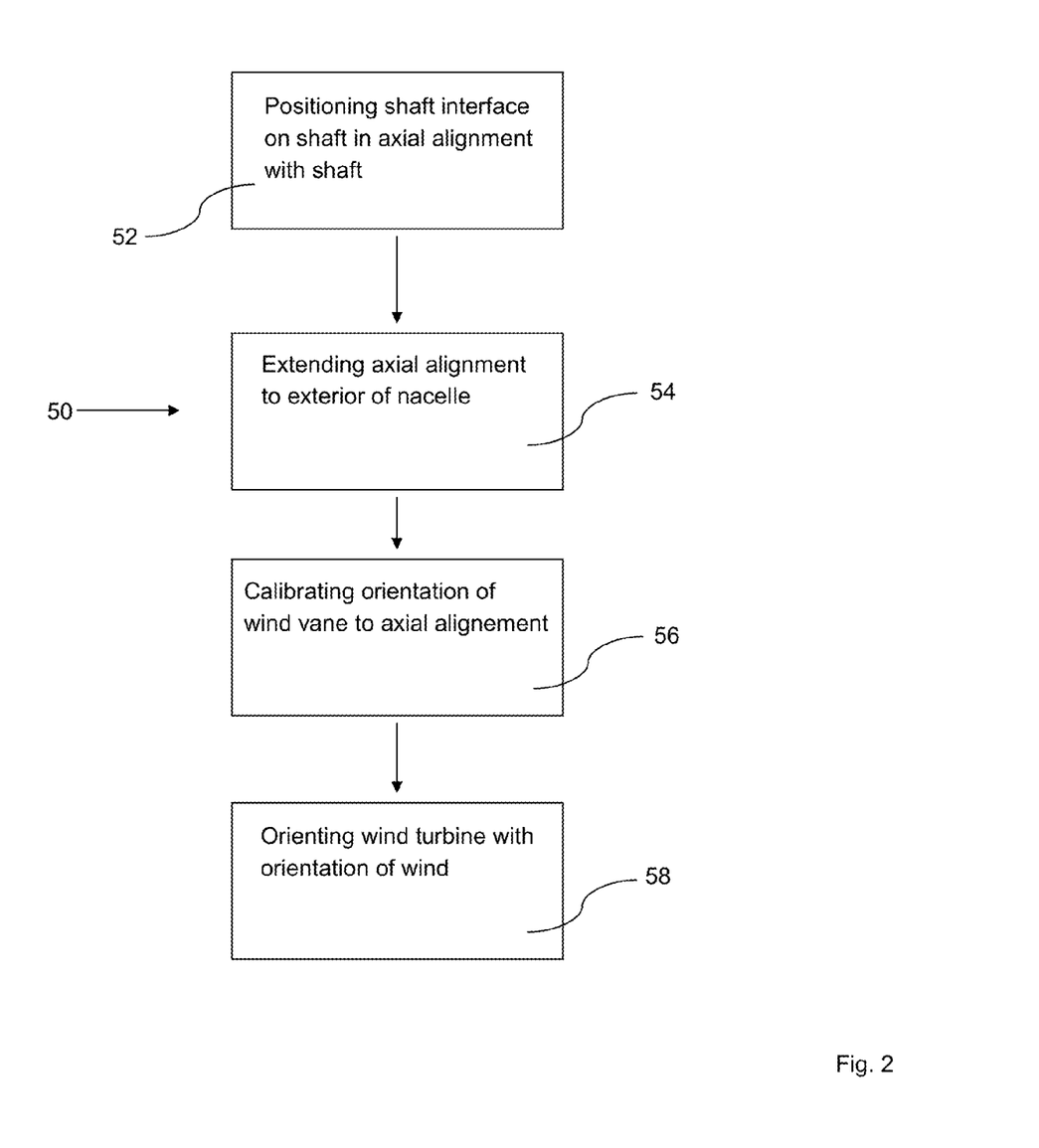
FIG. 2 is a flow chart of a method for calibrating a wind vane of a wind turbine in accordance with another exemplary embodiment of the present disclosure.

Referring to FIG. 2, there is illustrated at 50 a method for calibrating a wind vane/indicator of a horizontal-axis type wind turbine.

According to 52, a shaft interface is positioned on a shaft of the wind turbine, in axial alignment with a longitudinal axis of the shaft. For instance, positioning the shaft interface on a portion of the shaft may comprises positioning a first pair of contact surfaces being diametrically offset at a first axial position, and positioning a second pair of contact surfaces being diametrically offset at a second axial position.

According to 54, once the shaft interface is installed in the axial alignment on the shaft as in 52, the axial alignment may be extended to the exterior of the nacelle. This may for instance be done by interconnecting segments of an extended body from the shaft interface to an exterior of the nacelle. A stabilizer member may stabilize the extended body by being connected between a structure of the nacelle B and the extended body.

According to 56, an orientation of the wind vane is calibrated relative to the axial alignment. By doing so, the wind vane is in unknown alignment with the shaft of the wind turbine. In an embodiment, lines are drawn on a surface of the nacelle B to determine an angle between the axis of the shaft C and an orientation of the wind vane/indicator, which angle may for instance be used for a reset. The calibrating of the wind indicator device may comprise temporarily fixing the wind indicator device on the nacelle to compare the axial alignment of the shaft to the orientation of the wind indicator device.

According to 58, once the wind vane is calibrated, its reading may be used to orient the wind turbine to be in a desired alignment with a orientation of the wind or an optimal angle.

The invention claimed is:

1. A system for calibrating a wind indicator device of a wind turbine of the horizontal-axis type in which a shaft has a portion in a nacelle, the wind indicator device being on an exterior of the nacelle, the system comprising:
    a shaft interface adapted to be positioned on the shaft of the wind turbine in the nacelle, in a known manner relative to an orientation of the shaft;
    an extended body connected to the shaft interface in the nacelle, the extended body projecting from the shaft interface positioned on the shaft and in the nacelle, to an exterior of the nacelle; and
    an alignment device connected to the extended body, the alignment device having a visual indicator at the exterior of the nacelle representative of an orientation of the shaft of the wind turbine when the shaft interface is positioned on the shaft in the nacelle in the known manner;
    whereby a calibration of the wind indicator device is achieved using the visual indicator device.

2. The system according to claim 1, wherein the shaft interface comprises at least two contact surfaces adapted to abut against the shaft of the wind turbine in the known manner.

3. The system according to claim 2, wherein the shaft interface comprises four said contact surfaces, with a first pair of the contact surfaces being diametrically offset at a first axial location, and with a second pair of the contact surfaces being diametrically offset at a second axial location.

4. The system according to claim 2, wherein the shaft interface comprises four said contact surfaces, with a first pair of the contact surfaces being at ends of an inverted U-shaped structure, and with a second pair of the contact surfaces being at ends of another inverted U-shaped structure, the inverted U-shaped structures being interconnected by a beam.

5. The system according to claim 4, wherein the beam is releasably connected to the inverted U-shaped structures by joints.

6. The system according to claim 4, wherein the extended body is an elongated member connected to the beam of the shaft interface.

7. The system according to claim 1, wherein the extended body is an elongated member connected to shaft interface, the elongated member having a length of predetermined value to extend from the shaft interface to an exterior of the nacelle.

8. The system according to claim 7, further comprising a stabilizer device releasably connected to the elongated member and adapted to abut against part of the nacelle.

9. The system according to claim 8, further comprising a translational joint between the stabilizer device and the elongated member for the positioning of the joint along the elongated member to a desired height.

10. The system according to claim 8, further comprising a rotational joint between the stabilizer device and the elongated member for the orienting of the joint relative to the elongated member to abut against the part of the nacelle.

11. The system according to claim 7, wherein the elongated member and a longitudinal axis of the shaft lie in a common plane.

12. The system according to claim 1, wherein the visual indicator of the alignment device is parallel to the shaft.

13. The system according to claim 1, wherein visual indicator of the alignment device comprises a light emitting device producing a linear light beam.

14. The system according to claim 1, further comprising an alignment jig adapted to be secured to the wind indicator device in a known manner for temporarily fixing an orientation of the wind indicator device.

15. The system according to claim 14, wherein the alignment jig comprises a block adapted to receive a pointer of the wind indicator device, and a connection block for temporarily fixing the orientation of the pointer.

16. The system according to claim 14, wherein the alignment jig further comprises another visual indicator representative of an orientation of the wind indicator device.

17. A method for calibrating a wind indicator device of a wind turbine of the horizontal-axis type in which a shaft has a portion in a nacelle, the wind indicator device being on an exterior of the nacelle, the method comprising:
    positioning a shaft interface on a portion of the shaft in the nacelle in axial alignment with a longitudinal axis of the shaft;
    extending the axial alignment to an exterior of the nacelle by connecting an extended body to the shaft interface in the nacelle, the extended body having a visual indicator at the exterior of the nacelle representative of the axial alignment; and
    calibrating the wind indicator device by comparing the axial alignment of the shaft to an orientation of the wind indicator device.

18. The method according to claim 17, further comprising stabilizing the extended body using a stabilizer device on the extended body and abutting against a portion of the nacelle.

19. The method according to claim 17, wherein positioning the shaft interface on a portion of the shaft comprises positioning a first pair of contact surfaces being diametrically offset at a first axial position, and positioning a second pair of contact surfaces being diametrically offset at a second axial position.

20. The method according to claim 17, wherein calibrating the wind indicator device comprises temporarily fixing the wind indicator device on the nacelle to compare the axial alignment of the shaft to the orientation of the wind indicator device.

* * * * *